E. D. CRAMER.
Seed Coverer.

No. 82,092.  Patented Sept. 15, 1868.

Witnesses:  
Wm A Morgan  
G. C. Cotton

Inventor:  
E. D Cramer  
per Munn & Co  
Attorneys

United States Patent Office.

E. D. CRAMER, OF HACKETTSTOWN, NEW JERSEY.

Letters Patent No. 82,092, dated September 15, 1868.

IMPROVEMENT IN SEED-COVERERS.

*The Schedule referred to in these Letters Patent and making part of the same.*

TO ALL WHOM IT MAY CONCERN:

Be it known that I, E. D. CRAMER, of Hackettstown, in the county of Warren, and State of New Jersey, have invented a new and improved Seed-Coverer; and I do hereby declare that the following is a full, clear, and exact description thereof, which will enable others skilled in the art to make and use the same, reference being had to the accompanying drawings, forming a part of this specification.

Similar letters of reference indicate corresponding parts.

Figure 1:
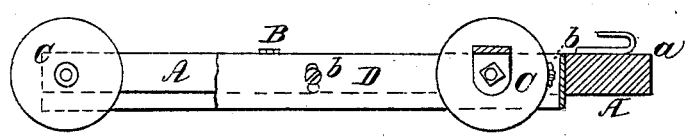
Figure 1 represents a sectional elevation of my improved seed-coverer, the plane of section being indicated by the line $x\,x$, fig. 2.
Figure 2:
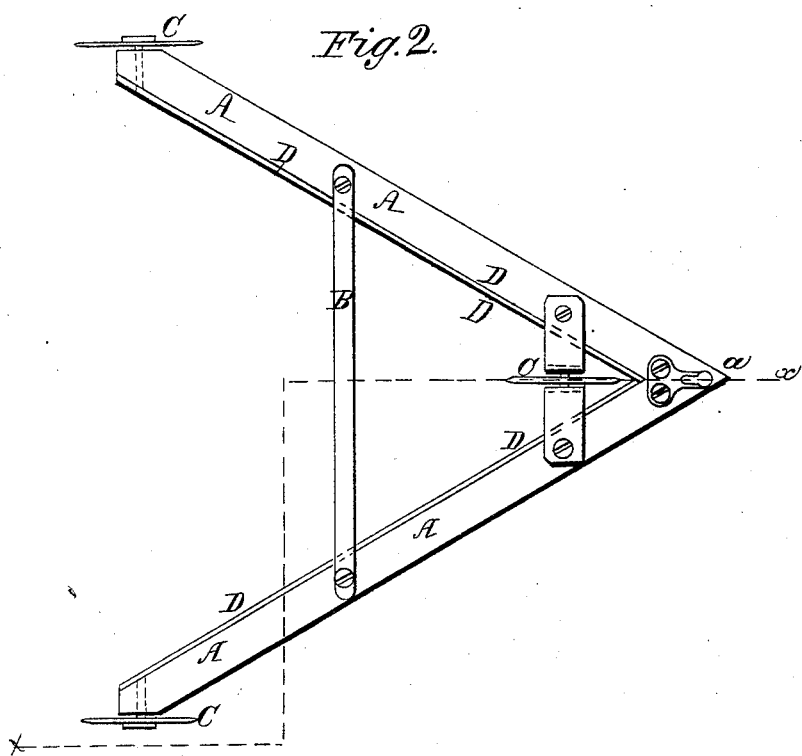
Figure 2 is a plan or top view of the same.

This invention relates to a new device for covering the seed behind a planting or seeding-machine, and consists of a triangular frame, which rests on three or more wheels, and which is attached behind a planter or seeding-machine, so as to follow its motion.

On the two sides of the frame which converge directly in front, are secured metal plates that are up-and-down adjustable, these plates acting as scrapers for covering the seed.

The whole frame is tight, and will easily pass over large obstacles, such as stones, roots, &c., while it will work the ground quite smooth, and will leave it in such shape as if a land-roller had passed over it.

A A, in the drawing, are two converging bars, connected at their rear ends by means of a rod or rods, B, thus forming, in connection with the same, a triangular frame, which is, with its point, $a$, in front, secured to a seeding or planting-apparatus.

The frame is supported on three or more sharp-edged wheels, C C, as shown.

To the sides of the bars A A are secured, by means of screws, bolts, or pins, $b\,b$, metal plates, D D, which are up-and-down adjustable by being slotted, as in fig. 1.

The plates are so adjusted that they project below the bars, and work in the loose soil. Thereby the apparatus, which appears like a pointed snow-plow, will, when drawn over and through the soil, be caused to fill all the furrows, and to cover the seed therein, and to leave the land quite smooth.

Having thus described my invention, what I claim as new, and desire to secure by Letters Patent, is—

A pointed seed-coverer, consisting of a triangular frame, A B, and of the up-and-down adjustable plates D D, all made and operating substantially as herein shown and described.

E. D. CRAMER.

Witnesses:
 ABM. K. HUTTON,
 W. W. GIBBS.